(12) United States Patent
Phillips et al.

(10) Patent No.: US 8,007,397 B2
(45) Date of Patent: Aug. 30, 2011

(54) MULTI-SPEED TRANSMISSION

(75) Inventors: Andrew W. Phillips, Saline, MI (US);
James M. Hart, Belleville, MI (US);
Scott H. Wittkopp, Ypsilanti, MI (US);
Clinton E. Carey, Monroe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 831 days.

(21) Appl. No.: 11/969,271

(22) Filed: Jan. 4, 2008

(65) Prior Publication Data

US 2008/0261759 A1 Oct. 23, 2008

Related U.S. Application Data

(60) Provisional application No. 60/913,248, filed on Apr. 20, 2007.

(51) Int. Cl.
*F16H 3/62* (2006.01)
(52) U.S. Cl. ....................................................... 475/277
(58) Field of Classification Search .................. 475/277
See application file for complete search history.

(56) References Cited

U.S. PATENT DOCUMENTS

| | | | |
|---|---|---|---|
| 4,038,888 A * | 8/1977 | Murakami et al. ............ | 475/276 |
| 6,176,803 B1 | 1/2001 | Meyer | |
| 6,342,026 B1 | 1/2002 | Takagi | |
| 6,547,688 B2 | 4/2003 | Takagi | |
| 6,736,751 B1 | 5/2004 | Usoro | |
| 6,743,139 B1 | 6/2004 | Usoro | |
| 6,743,140 B1 | 6/2004 | Lee | |
| 6,743,142 B1 | 6/2004 | Lee | |
| 6,743,143 B1 | 6/2004 | Usoro | |
| 6,743,144 B1 | 6/2004 | Lee | |
| 6,746,357 B1 | 6/2004 | Usoro | |
| 6,752,736 B1 | 6/2004 | Lee | |
| 6,755,765 B2 | 6/2004 | Usoro | |
| 6,758,784 B2 | 7/2004 | Lee | |
| 6,758,787 B2 | 7/2004 | Usoro | |
| 6,764,424 B1 | 7/2004 | Usoro | |
| 6,764,425 B2 | 7/2004 | Lee | |
| 6,764,426 B2 | 7/2004 | Usoro et al. | |
| 6,767,307 B1 | 7/2004 | Lee | |
| 6,811,512 B2 | 11/2004 | Usoro | |
| 6,837,823 B2 | 1/2005 | Lee | |
| 6,852,059 B2 | 2/2005 | Lee | |
| 6,960,149 B2 | 11/2005 | Ziemer | |
| 7,011,597 B2 | 3/2006 | Haka | |
| 7,014,589 B2 | 3/2006 | Stevenson | |
| 7,128,683 B2 | 10/2006 | Oguri | |
| 7,163,484 B2 | 1/2007 | Klemen | |
| 2006/0019791 A1 | 1/2006 | Baldwin | |
| 2006/0270514 A1 | 11/2006 | Oguri | |
| 2006/0270516 A1 * | 11/2006 | Klemen ........................ | 475/280 |

FOREIGN PATENT DOCUMENTS

DE 102004040904 A1 3/2006

* cited by examiner

*Primary Examiner* — David D Le
*Assistant Examiner* — Erin D Bishop

(57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may be either brakes or clutches. Eight forward speeds or gear ratios and reverse are achieved by engaging various combinations of the brakes and clutches.

11 Claims, 3 Drawing Sheets

| GEAR STATE | GEAR RATIO | RATIO STEP | CLUTCHING ELEMENTS ||||| 
|---|---|---|---|---|---|---|---|
| | | | 30 | 32 | 34 | 36 | 38 |
| Rev | -2.437 | | X | | X | | |
| N | | | | | O | | |
| 1st | 4.379 | | | | X | | X |
| 2nd | 2.835 | 1.54 | | X | X | | |
| 3rd | 1.892 | 1.50 | | | X | X | |
| 4th | 1.275 | 1.48 | | X | | X | |
| 5th | 1.000 | 1.28 | | | | X | X |
| 6th | 0.875 | 1.14 | X | | | X | |
| 7th | 0.714 | 1.23 | X | | | | X |
| 8th | 0.531 | 1.35 | X | X | | | |

X= ON, CARRYING TORQUE   O= ON, NOT CARRYING TORQUE

| GEAR STATE | GEAR RATIO | RATIO STEP | CLUTCHING ELEMENTS ||||| 
|---|---|---|---|---|---|---|---|
| | | | 130 | 132 | 134 | 136 | 138 |
| Rev | -2.664 | | X | | X | | X |
| N | | -0.72 | O | | O | | |
| 1st | 3.700 | | X | | X | X | |
| 2nd | 2.522 | 1.47 | X | X | X | | |
| 3rd | 1.699 | 1.48 | | X | X | X | |
| 4th | 1.316 | 1.29 | | X | X | | X |
| 5th | 1.000 | 1.32 | | | X | X | X |
| 6th | 0.767 | 1.30 | | X | | X | X |
| 7th | 0.650 | 1.16 | X | | | X | X |
| 8th | 0.523 | 1.24 | X | X | | | X |

X= ON, CARRYING TORQUE    O= ON, NOT CARRYING TORQUE

MULTI-SPEED TRANSMISSION

CROSS-REFERENCE TO RELATED APPLICATIONS

This application claims the benefit of U.S. Provisional Application No. 60/913,248, filed on Apr. 20, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting brakes and clutches.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes.

An embodiment of the transmission of the present invention includes a first, second, third and fourth planetary gear sets each having first, second and third members, a first interconnecting member continuously interconnecting the second member of the first planetary gear set with the first member of the second planetary gear set, a second interconnecting member continuously interconnecting the third member of the first planetary gear set with the second member of the second planetary gear set, a third interconnecting member continuously interconnecting the second member of the second planetary gear set with the third member of the third planetary gear set, a fourth interconnecting member continuously interconnecting the third member of the second planetary gear set with the second member of the fourth planetary gear set, a fifth interconnecting member continuously interconnecting the first member of the third planetary gear set with the first member of the fourth planetary gear set. Five torque-transmitting mechanisms are selectively engageable to interconnect one of the first, second, and third members with another of the first, second, third members, and a stationary element. The torque-transmitting mechanisms are selectively engageable in combinations of at least two to establish at least eight forward speed ratios and at least one reverse speed ratio.

In one aspect of the present invention, a first of the five torque transmitting mechanisms is selectively engageable to interconnect the first member of the first planetary gear set with the stationary element.

In another aspect of the present invention, a second of the five torque transmitting mechanisms is selectively engageable to interconnect the first member of the third planetary gear set with the stationary element.

In yet another aspect of the present invention, a third of the five torque transmitting mechanisms is selectively engageable to interconnect the third member of the fourth planetary gear set with the stationary element.

In yet another aspect of the present invention, a fourth of the five torque transmitting mechanisms is selectively engageable to interconnect the third member of the first planetary gear set with the third member of the fourth planetary gear set.

In yet another aspect of the present invention, a fifth of the five torque transmitting mechanisms is selectively engageable to interconnect the third member of the second planetary gear set with the second member of the third planetary gear set.

In yet another aspect of the present invention, the first members are sun gears, the second members are carrier members, and the third members are ring gears.

In yet another aspect of the present invention, the input member is continuously interconnected with the second member of the first planetary gear set and with the first member of the second planetary gear set and wherein the output member is continuously interconnected with the second member of the third planetary gear set.

Another embodiment of the transmission of the present invention includes an input member, an output member, first, second, third and fourth planetary gear sets each having first, second and third members, wherein the input member is continuously interconnected with the second member of the first planetary gear set and with the first member of the second planetary gear set and wherein the output member is continuously interconnected with the second member of the third planetary gear set, a first interconnecting member continuously interconnecting the second member of the first planetary gear set with the first member of the second planetary gear set, a second interconnecting member continuously interconnecting the third member of the first planetary gear set with the second member of the second planetary gear set, a third interconnecting member continuously interconnecting the second member of the second planetary gear set with the third member of the third planetary gear set, a fourth interconnecting member continuously interconnecting the third member of the second planetary gear set with the second member of the fourth planetary gear set, and a fifth interconnecting member continuously interconnecting the first member of the third planetary gear set with the first member of the fourth planetary gear set. A first torque transmitting mechanism is selectively engageable to interconnect the first member of the first planetary gear set with the stationary element. A second torque transmitting mechanism is selectively engageable to interconnect the first member of the third planetary gear set with the stationary element. A third torque transmitting mechanism is selectively engageable to interconnect the third member of the fourth planetary gear set with the stationary element. A fourth torque transmitting mechanism is selectively engageable to interconnect the third member of the first planetary gear set with the third member of the fourth planetary gear set. A fifth torque transmitting mechanism is selectively engageable to interconnect the second member of the fourth planetary gear set with the second member of the third planetary gear set. The torque-transmitting mechanisms are selectively engageable in combinations of at least two to establish at least eight forward speed ratios and at least one reverse speed ratio between the input member and the output member.

In one aspect of the present invention, the first members are sun gears, the second members are carrier members, and the third members are ring gears.

Further embodiments, aspects, objects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the first and the second embodiments of the eight speed automatic transmission of the present invention have an arrangement of permanent mechanical connections between the elements of the four planetary gear sets in common. These mechanical connections generically link or relate the two transmission embodiments. A first component or element of a first planetary gear set is permanently coupled to a first component or element of a second planetary gear set. The first component or element of the second planetary gear set is also permanently coupled to a first component or element of a third planetary gear set. A second component or element of the first planetary gear set is permanently coupled to a second component or element of the second planetary gear set. A third component or element of the second planetary gear set is permanently coupled to a third component or element of a fourth planetary gear set. A second component or element of the third planetary gear set is permanently coupled to a second component or element of the fourth planetary gear set.

Figure 1:
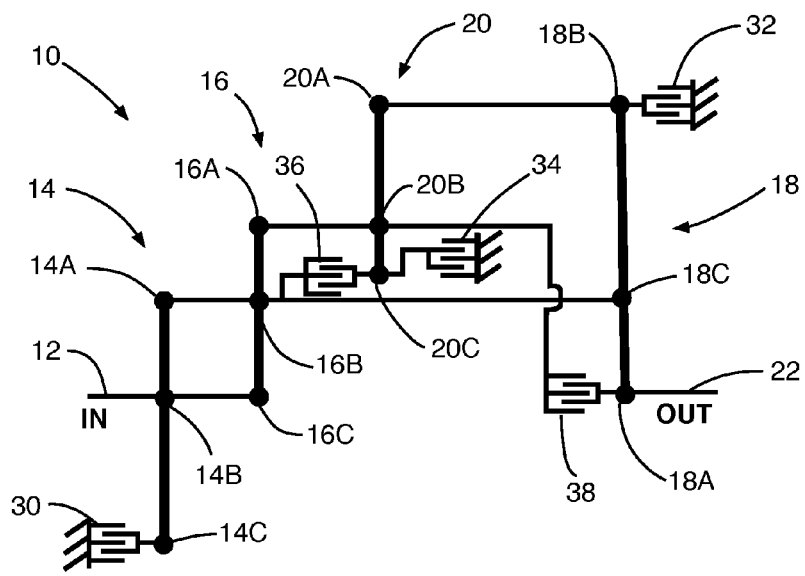
FIG. 1 is a lever diagram of a first embodiment of an eight speed automatic transmission according to the present invention.

Referring now to FIG. 1, a first embodiment of an eight speed automatic transmission 10 is illustrated in a lever diagram. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier and one for the ring gear. The relative length of each lever between the nodes can be used to represent the ring-to-sun ratio of each respective gear set. These lever ratios, in turn, are used to vary the gear ratios of the transmission in order to achieve appropriate ratios and an appropriate ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The first embodiment of the eight speed automatic transmission 10 includes an input shaft 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft 22. The input shaft 12 is coupled to the second node 14B of the first planetary gear set 14 and the third node 16C of the second planetary gear set 16. The output shaft 22 is coupled to the first node 18A of the third planetary gear set 18. The first node 14A of the first planetary gear set 14 is coupled to the second node 16B of the second planetary gear set 16 and the third node 18C of the third planetary gear set 18. The third node 14C of the first planetary gear set 14 is selectively grounded by a first brake 30. The first node 16A of the second planetary gear set 16 is coupled to the second node 20B of the fourth planetary gear set 20 and selectively connected to the first node 18A of the third planetary gear set 18 and the output shaft 22 by a second clutch 38.

The first node 20A of the fourth planetary gear set 20 is coupled to the second node 18B of the third planetary gear set 18 and both nodes 18B and 20A are selectively grounded by a second brake 32. The third node 20C of the fourth planetary gear set 20 is selectively connected to the first node 14A of the first planetary gear set 14, the second node 16B of the second planetary gear set 16 and the third node 18C of the third planetary gear set 18 by a first clutch 36. The third node 20C of the fourth planetary gear set 20 also is selectively grounded by a third brake 34.

Figure 2:
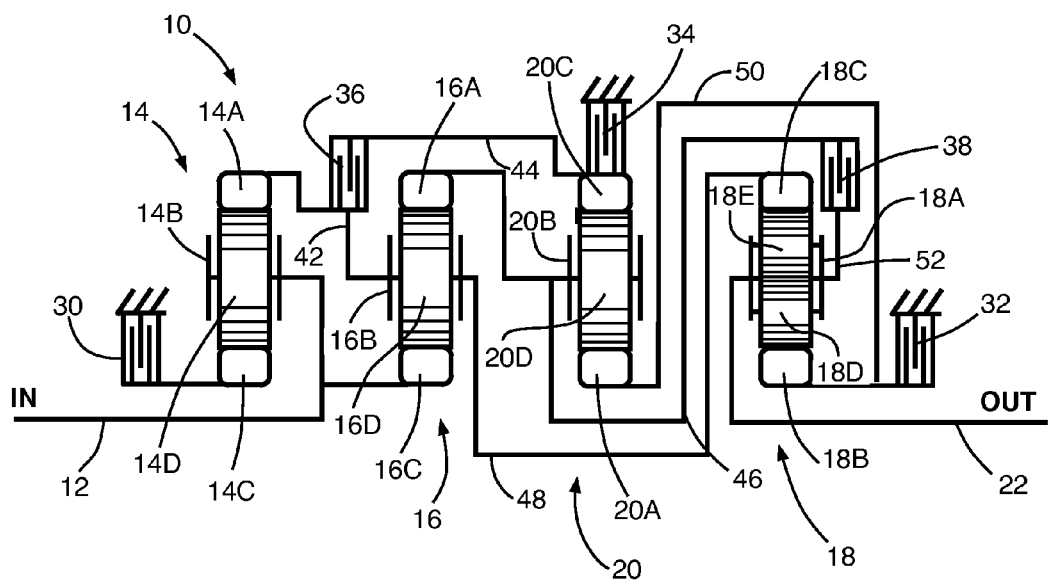
FIG. 2 is a diagrammatic view of a first embodiment of an eight speed automatic transmission according to the present invention.

Referring now to FIG. 2, a stick diagram presents a schematic layout of the first embodiment of the eight speed automatic transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets, namely sun gears, ring gears and planet gear carriers. The transmission 10 includes the input shaft 12 which is coupled to and directly drives a first planet gear carrier 14B of the first planetary gear set 14 and a second sun gear 16C of the second planetary gear set 16. The first planet carrier 14B includes a plurality of planet gears 14D rotatably disposed thereon. The output shaft 22 is coupled to and directly driven by a third planet gear carrier 18A of the third planetary gear set 18. The third planet gear carrier 18A includes a plurality of pairs or sets of planet gears 18D and 18E rotatably disposed thereon.

A first shaft, quill or interconnecting member 42 interconnects a first ring gear 14A of the first planetary gear set 14 with the first clutch 36 and a second planet gear carrier 16B of the second planetary gear set 16. The second planet gear carrier 16B includes a plurality of planet gears 16D rotatably disposed thereon. A second shaft, quill or interconnecting member 44 connects the first clutch 36 to a fourth ring gear 20C of the fourth planetary gear set 20. A third shaft, quill or interconnecting member 46 interconnects a second ring gear 16A of the second planetary gear set 16 with a fourth planet gear carrier 20B of the fourth planetary gear set 20 and the second clutch 38. The fourth planet gear carrier 20B includes a plurality of planet gears 20D rotatably disposed thereon. A fourth shaft, quill or interconnecting member 48 connects the second planet gear carrier 16B of the second planetary gear set 16 to the third ring gear 18C of the third planetary gear set 18. A fifth shaft, quill or interconnecting member 50 interconnects a fourth sun gear 20A of the fourth planetary gear set 20 with a third sun gear 18B of the third planetary gear set 18 and the second brake 32. A sixth shaft, quill or interconnecting member 52 connects the third planet gear carrier 18A of the third planetary gear set 18 to the second clutch 38.

The torque-transmitting mechanisms or clutches 36 and 38 and the brakes 30, 32, and 34 allow for selective interconnection of the shafts or interconnecting members, members of the planetary gear sets and the housing. For example, the first clutch 36 is selectively engageable to connect the first interconnecting member 42 to the second interconnecting member 44. The second clutch 38 is selectively engageable to connect the third interconnecting member 46 to the sixth interconnecting member 52. The first brake 30 is selectively engageable to connect the first sun gear 14C to the ground or transmission housing to restrict rotation of the first sun gear 14C relative to the housing. The second brake 32 is selectively engageable to connect the fifth interconnecting member 50 to the ground or transmission housing to restrict rotation of the fifth interconnecting member 50 relative to the housing. Finally, the third brake 34 is selectively engageable to connect the fourth ring gear 20C to the ground or transmission housing to restrict rotation of the fourth ring gear 20C relative to the housing.

Figures 3, 4:
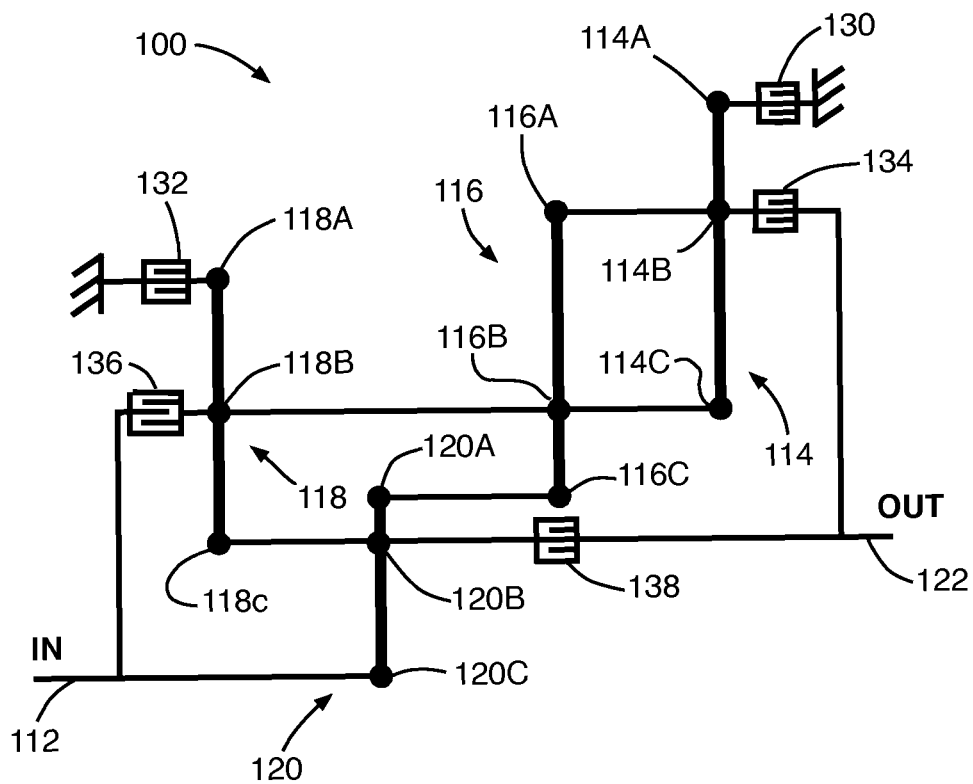
FIG. 3 is a truth table presenting the state of engagement of the various torque transmitting brakes and clutches in neutral and each of the available forward and reverse speeds or gear ratios of the eight speed automatic transmission illustrated in FIGS. 1 and 2.
FIG. 4 is a lever diagram of a second embodiment of an eight speed automatic transmission according to the present invention.

Referring now to FIGS. 2 and 3, the operation of the first embodiment of the eight speed automatic transmission 10 will be described. It will be appreciated that the automatic transmission 10 is capable of transmitting torque from the input shaft 12 to the output shaft 22 in eight forward speed or torque ratios and one reverse speed or torque ratio. Each forward and reverse speed or torque ratio is attained by engagement of a combination of two of the clutches or brakes as will be explained below. FIG. 3 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10.

To establish reverse gear, the first brake 30 and the third brake 34 are engaged or activated. The first brake 30 grounds the first sun gear 14C of the first planetary gear set 14 and the third brake 34 grounds the fourth ring gear 20C of the fourth planetary gear set 20.

Similarly, the eight forward speed or gear ratios are achieved through different combinations of brake and clutch engagement per FIG. 3

It will be appreciated that the operation and gear states of the eight speed automatic transmission 10 assumes, first of all, that all brakes and clutches not specifically referenced in a given gear state are inactive or disengaged and, second of all, that during gear shifts, i.e., changes of gear state, between at least adjacent gear states, a clutch or brake engaged or activated in both gear states will remain engaged or activated during the shift.

Turning now to FIG. 4, a lever diagram for a second embodiment of an eight speed automatic transmission 100 is illustrated. The automatic transmission 100 includes an input shaft 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft 122.

The input shaft 112 is coupled to the third node 120C of the fourth planetary gear set 120. The output shaft 122 is selectively connected to the second node 114B of the first planetary gear set 114 through a first clutch 134 and to the second node 120B of the fourth planetary gear set 120 through a third clutch 138. The first node 114A of the first planetary gear set 114 is selectively grounded through a first brake 130. The first node 118A of the third planetary gear set 118 is selectively grounded through a second brake 132. The second node 118B of the third planetary gear set 118 is coupled to the second node 116B of the second planetary gear set 116 and to the third node 114C of the first planetary gear set 114. The second node 118B of the third planetary gear set 118 is also selectively connected to the input shaft 112 through a second clutch 136. The third node 118C of the third planetary gear set 118 is coupled to the second node 120B of the fourth planetary gear set 120 and is selectively connected to the output shaft 122 through a third clutch 138. The first node 120A of the fourth planetary gear set 120 is coupled to the third node 116C of the second planetary gear set 116. The first node 116A of the second planetary gear set 116 is coupled to the second node 114B of the first planetary gear set 114.

Figures 5, 6:
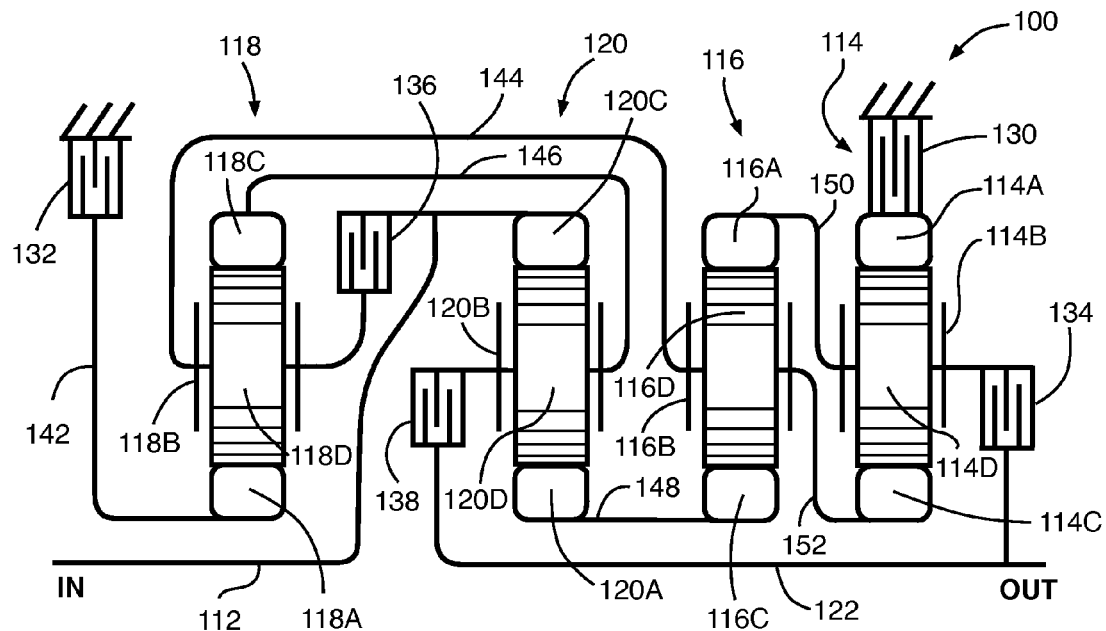
FIG. 5 is a diagrammatic view of a second embodiment of an eight speed automatic transmission according to the present invention.
FIG. 6 is a truth table presenting the state of engagement of the various torque transmitting brakes and clutches in neutral and each of the available forward and reverse speeds or gear ratios of the eight speed automatic transmission illustrated in FIGS. 4 and 5.

Referring now to FIG. 5, a stick diagram presents a schematic layout of the second embodiment of the eight speed automatic transmission 100 according to the present invention. In FIG. 5, the numbering from the lever diagram of FIG. 4 is carried over. The clutches, brakes and couplings are correspondingly presented whereas the nodes of the planetary gear sets now appear as components of planetary gear sets such a sun gears, ring gears and planet gear carriers.

The transmission 100 includes the input shaft 112 which is connected to and directly drives a fourth ring gear 120C of the fourth planetary gear set 120. Also connected to and driven by the input shaft 112 is the second clutch 136. The output shaft 122 interconnects and is selectively driven by the first clutch 134 and the third clutch 138. A first shaft, quill or interconnecting member 142 connects the first brake 132 to a first sun gear 118A of the third planetary gear set 118. A second shaft, quill or interconnecting member 144 interconnects a second planetary gear carrier 116B of the second planetary gear set 116 to a third planetary gear carrier 118B of the third planetary gear set 118 and the second clutch 136. The second planet gear carrier 116B includes a plurality of planet gears 116D which are rotatably disposed thereon. The third planet gear carrier 118B includes a plurality of planet gears 118D rotatably disposed thereon. A third shaft, quill or interconnecting member 146 connects a third ring gear 118C of the third planetary gear set 118 to a fourth planetary gear carrier 120B of the fourth planetary gear set 120 and the third clutch 138. The fourth planet gear carrier 120B includes a plurality of planet gears 120D which are rotatably disposed thereon.

A fourth shaft or interconnecting member 148 connects a second sun gear 116C of the second planetary gear set 116 to a fourth sun gear 120A of the fourth planetary gear set 120. A fifth shaft, quill or interconnecting member 150 interconnects a second ring gear 116A of the second planetary gear set 116 to a first planet gear carrier 114B of the first planetary gear set 114. The first planet gear carrier 114B includes a plurality of planet gears 114D which are rotatably disposed thereon. Finally, a sixth shaft, quill or interconnecting member 152, which may be an extension or portion of the second shaft, quill or interconnecting member 144, connects a first sun gear 114C of the first planetary gear set 114 to the second planet gear carrier 116B of the second planetary gear set 116.

The torque-transmitting mechanisms or clutches 134, 136, and 138 and the brakes 130 and 132 allow for selective interconnection of the shafts or interconnecting members, members of the planetary gear sets and the housing. For example, the first clutch 134 is selectively engageable to connect the first planet carrier 114B to the output shaft 122. The second clutch 136 is selectively engageable to connect the third planet carrier 118B to the input shaft 112 and the fourth ring gear 120C. The third clutch 138 is selectively engageable to connect the fourth planet carrier 120B to the output shaft 122. The first brake 130 is selectively engageable to connect the first ring gear 114A to the ground or transmission housing to restrict rotation of the first ring gear 114A relative to the housing. Finally, the second brake 132 is selectively engageable to connect the third sun gear 118A to the ground or transmission housing to restrict rotation of the third sun gear 118A relative to the housing.

Referring now to FIGS. 5 and 6, the operation of the second embodiment of the eight speed automatic transmission 100 will now be described. It will be appreciated that the automatic transmission 100 is capable of transmitting torque from the input shaft 112 to the output shaft 122 in eight forward speed or torque ratios and one reverse speed or torque ratio. Each forward and reverse speed or torque ratio is attained by engagement of a combination of three of the brakes or clutches as will be explained below. FIG. 6 is a truth table presenting the various combinations of the brakes and clutches that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 100.

To establish reverse gear, the first brake 130, the first clutch 134 and the third clutch 138 are activated or engaged. The first brake 130 grounds the first ring gear 114A of the first planetary gear set 114. The first clutch 134 connects the first planet carrier 114B of the first planetary gear set 114 and the second ring gear 116A of the second planetary gear set 116 to the output shaft 122. The third clutch 138 also connects the third ring gear 118C of the third planetary gear set 118 and the fourth planet gear carrier 120B of the fourth planetary gear set 120 to the output shaft 122.

In a similar manner, the eight forward speed or gear ratios are achieved through different combinations of brake and clutch engagement per FIG. 6.

It will be appreciated that the foregoing explanation of operation and gear states of the eight speed automatic transmission 100 assumes, first of all, that all brakes and clutches not specifically referenced in a given gear state are inactive or disengaged and, second of all, that during gear shifts, i.e., changes of gear state, between at least adjacent gear states, a clutch or brake engaged or activated in both gear states will remain engaged or activated during the shift.

The foregoing description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members;
a first interconnecting member continuously interconnecting the second member of the first planetary gear set with the first member of the second planetary gear set;
a second interconnecting member continuously interconnecting the third member of the first planetary gear set with the second member of the second planetary gear set;
a third interconnecting member continuously interconnecting the second member of the second planetary gear set with the third member of the third planetary gear set;
a fourth interconnecting member continuously interconnecting the third member of the second planetary gear set with the second member of the fourth planetary gear set;
a fifth interconnecting member continuously interconnecting the first member of the third planetary gear set with the first member of the fourth planetary gear set; and
five torque transmitting mechanisms each selectively engageable to interconnect one of the first, second, and third members with another of a stationary element, the first members, the second members, and the third members of the first, second, third, and fourth planetary gear sets, wherein a first of the five torque transmitting mechanisms is selectively engageable to interconnect the first member of the first planetary gear set with the stationary element; and
wherein the input member is continuously interconnected with at least one of the first members, the second members, and the third members of the first, second, third, and fourth planetary gear sets, and
wherein the torque transmitting mechanisms are selectively engageable in combinations of at least two to establish at least eight forward speed ratios and at least one reverse speed ratio between the input member and the output member.

2. The transmission of claim 1 wherein a second of the five torque transmitting mechanisms is selectively engageable to interconnect the first member of the third planetary gear set with the stationary element.

3. The transmission of claim 2 wherein a third of the five torque transmitting mechanisms is selectively engageable to interconnect the third member of the fourth planetary gear set with the stationary element.

4. The transmission of claim 3 wherein a fourth of the five torque transmitting mechanisms is selectively engageable to interconnect the third member of the first planetary gear set with the third member of the fourth planetary gear set.

5. The transmission of claim 4 wherein a fifth of the five torque transmitting mechanisms is selectively engageable to interconnect the third member of the second planetary gear set with the second member of the third planetary gear set.

6. The transmission of claim 1 wherein the first members of the first, second, third, and fourth planetary gear sets are sun gears, the second members of the first, second, third, and fourth planetary gear sets are carrier members, and the third members of the first, second, third, and fourth planetary gear sets are ring gears.

7. The transmission of claim 1 wherein the input member is continuously interconnected with the second member of the first planetary gear set and with the first member of the second planetary gear set and wherein the output member is continuously interconnected with the second member of the third planetary gear set.

8. The transmission of claim 1 wherein the torque transmitting mechanisms include two clutches and three brakes.

9. A transmission comprising:
    an input member;
    an output member;
    first, second, third and fourth planetary gear sets each having first, second and third members, wherein the input member is continuously interconnected with the second member of the first planetary gear set and with the first member of the second planetary gear set and wherein the output member is continuously interconnected with the second member of the third planetary gear set;
    a first interconnecting member continuously interconnecting the second member of the first planetary gear set with the first member of the second planetary gear set;
    a second interconnecting member continuously interconnecting the third member of the first planetary gear set with the second member of the second planetary gear set;
    a third interconnecting member continuously interconnecting the second member of the second planetary gear set with the third member of the third planetary gear set;
    a fourth interconnecting member continuously interconnecting the third member of the second planetary gear set with the second member of the fourth planetary gear set;
    a fifth interconnecting member continuously interconnecting the first member of the third planetary gear set with the first member of the fourth planetary gear set;
    a first torque transmitting mechanism selectively engageable to interconnect the first member of the first planetary gear set with the stationary element;
    a second torque transmitting mechanism selectively engageable to interconnect the first member of the third planetary gear set with the stationary element;
    a third torque transmitting mechanism selectively engageable to interconnect the third member of the fourth planetary gear set with the stationary element;
    a fourth torque transmitting mechanism selectively engageable to interconnect the third member of the first planetary gear set with the third member of the fourth planetary gear set; and
    a fifth torque transmitting mechanism selectively engageable to interconnect the second member of the third planetary gear set with the third member of the second planetary gear set; and
    wherein the torque transmitting mechanisms are selectively engageable in combinations of at least two to establish at least eight forward speed ratios and at least one reverse speed ratio between the input member and the output member.

10. The transmission of claim 9 wherein the first members of the first, second, third, and fourth planetary gear sets are sun gears, the second members of the first, second, third, and fourth planetary gear sets are carrier members, and the third members of the first, second, third, and fourth planetary gear sets are ring gears.

11. A transmission comprising:
    an input member;
    an output member;
    first, second, third and fourth planetary gear sets each having a sun gear, a carrier member, and a ring gear, wherein the input member is continuously interconnected with the carrier member of the first planetary gear set and with the sun gear of the second planetary gear set and wherein the output member is continuously interconnected with the carrier member of the third planetary gear set;
    a first interconnecting member continuously interconnecting the carrier member of the first planetary gear set with the sun gear of the second planetary gear set;
    a second interconnecting member continuously interconnecting the ring gear of the first planetary gear set with the carrier member of the second planetary gear set;
    a third interconnecting member continuously interconnecting the carrier member of the second planetary gear set with the ring gear of the third planetary gear set;
    a fourth interconnecting member continuously interconnecting the ring gear of the second planetary gear set with the carrier member of the fourth planetary gear set;
    a fifth interconnecting member continuously interconnecting the sun gear of the third planetary gear set with the sun gear of the fourth planetary gear set;
    a first torque transmitting mechanism selectively engageable to interconnect the sun gear of the first planetary gear set with the stationary element;
    a second torque transmitting mechanism selectively engageable to interconnect the sun gear of the third planetary gear set with the stationary element;
    a third torque transmitting mechanism selectively engageable to interconnect the ring gear of the fourth planetary gear set with the stationary element;
    a fourth torque transmitting mechanism selectively engageable to interconnect the ring gear of the first planetary gear set with the ring gear of the fourth planetary gear set; and
    a fifth torque transmitting mechanism selectively engageable to interconnect the carrier member of the third planetary gear set with the ring gear of the second planetary gear set; and
    wherein the torque-transmitting mechanisms are selectively engageable in combinations of at least two to establish at least eight forward speed ratios and at least one reverse speed ratio between the input member and the output member.

* * * * *